(12) United States Patent
You et al.

(10) Patent No.: US 8,891,398 B2
(45) Date of Patent: *Nov. 18, 2014

(54) APPARATUS AND METHOD FOR TRANSMITTING AND RECEIVING INFORMATION THROUGH FAST FEEDBACK CHANNEL IN BROADBAND WIRELESS COMMUNICATION SYSTEM

(71) Applicant: Samsung Electronics Co. Ltd., Suwon-si (KR)

(72) Inventors: Hwa-Sun You, Suwon-si (KR); Hee-Won Kang, Seongnam-si (KR); Jae-Hee Cho, Seoul (KR); Sang-Heon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

This patent is subject to a terminal disclaimer.

(21) Appl. No.: 13/693,541

(22) Filed: Dec. 4, 2012

(65) Prior Publication Data
US 2013/0094469 A1 Apr. 18, 2013

Related U.S. Application Data

(63) Continuation of application No. 12/540,655, filed on Aug. 13, 2009, now Pat. No. 8,345,566.

(30) Foreign Application Priority Data

Aug. 13, 2008 (KR) .......................... 10-2008-0079418
Feb. 25, 2009 (KR) .......................... 10-2009-0016051
Mar. 5, 2009 (KR) .......................... 10-2009-0019029

(51) Int. Cl.
H04L 12/26 (2006.01)
H04L 5/00 (2006.01)
H04L 1/00 (2006.01)
H04W 72/04 (2009.01)
H04L 27/26 (2006.01)

(52) U.S. Cl.
CPC ........... *H04W 72/04* (2013.01); *H04L 27/2647* (2013.01); *H04L 5/0007* (2013.01); *H04L 5/0042* (2013.01); *H04L 1/0028* (2013.01); *H04L 27/2626* (2013.01)
USPC ........................... 370/252; 375/260; 375/250

(58) Field of Classification Search
USPC ......... 370/203, 204, 205, 206, 208, 210, 329, 370/252; 375/259, 260, 265, 130, 139, 147, 375/150
See application file for complete search history.

(56) References Cited

U.S. PATENT DOCUMENTS

2005/0259627 A1 11/2005 Song et al.
2005/0265227 A1 12/2005 Byun et al.
(Continued)

FOREIGN PATENT DOCUMENTS

CN 1623293 A 6/2005
CN 1808962 A 7/2006
(Continued)

*Primary Examiner* — Dady Chery
(74) *Attorney, Agent, or Firm* — Jefferson IP Law, LLP

(57) ABSTRACT

An apparatus and method for transmitting information through a fast feedback channel in a wireless communications system are provided. The apparatus includes a plurality of mappers for mapping a sequence, corresponding to an index to be fed back, to a first set of resource blocks in a fast feedback channel by using a first mapping pattern and to a second set of resource blocks in the fast feedback channel by using a second mapping pattern, and a transmitter for transmitting the sequence mapped to a plurality of sets of resource blocks, wherein the sequence is mapped to each of the plurality of sets of resource blocks, and wherein each element of the sequence is mapped to each resource block.

8 Claims, 13 Drawing Sheets

(56) References Cited

U.S. PATENT DOCUMENTS

| | | |
|---|---|---|
| 2007/0070967 A1 | 3/2007 | Yang et al. |
| 2007/0071075 A1 | 3/2007 | Yang et al. |
| 2007/0165739 A1 | 7/2007 | Hottinnen et al. |
| 2007/0177541 A1 | 8/2007 | Kwon et al. |
| 2007/0189151 A1 | 8/2007 | Pan et al. |
| 2007/0211672 A1 | 9/2007 | Song et al. |
| 2008/0165677 A1 | 7/2008 | You et al. |
| 2008/0225792 A1 | 9/2008 | Naguib et al. |
| 2010/0086080 A1 | 4/2010 | Zhu et al. |
| 2010/0142630 A1 | 6/2010 | Kuri et al. |

FOREIGN PATENT DOCUMENTS

| | | |
|---|---|---|
| JP | 2007-97173 A | 4/2007 |
| JP | 2008-500763 A | 1/2008 |
| JP | 2010-521887 A | 6/2010 |
| RU | 2 262 201 C1 | 10/2005 |
| WO | 2007/013561 A1 | 2/2007 |

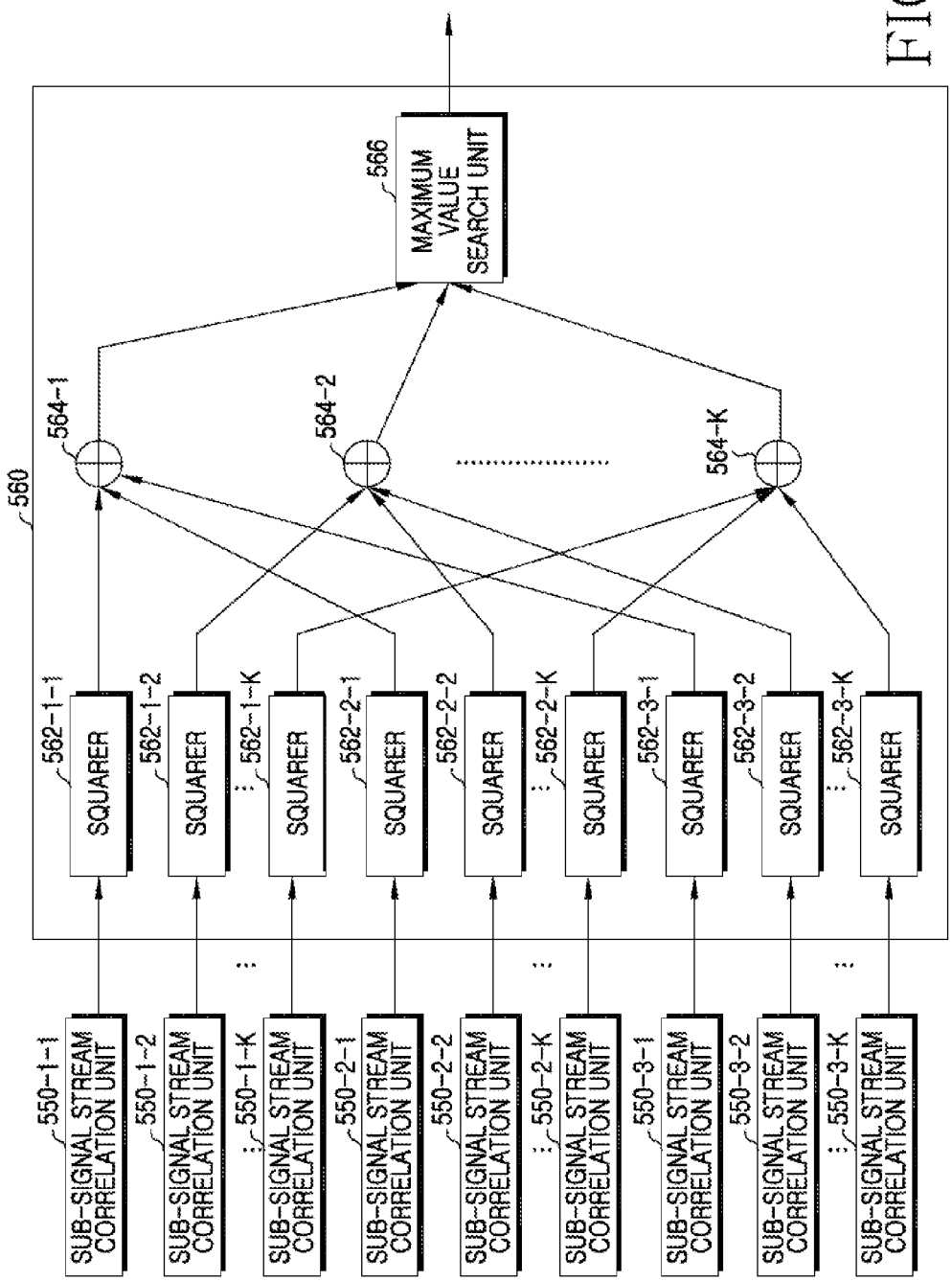

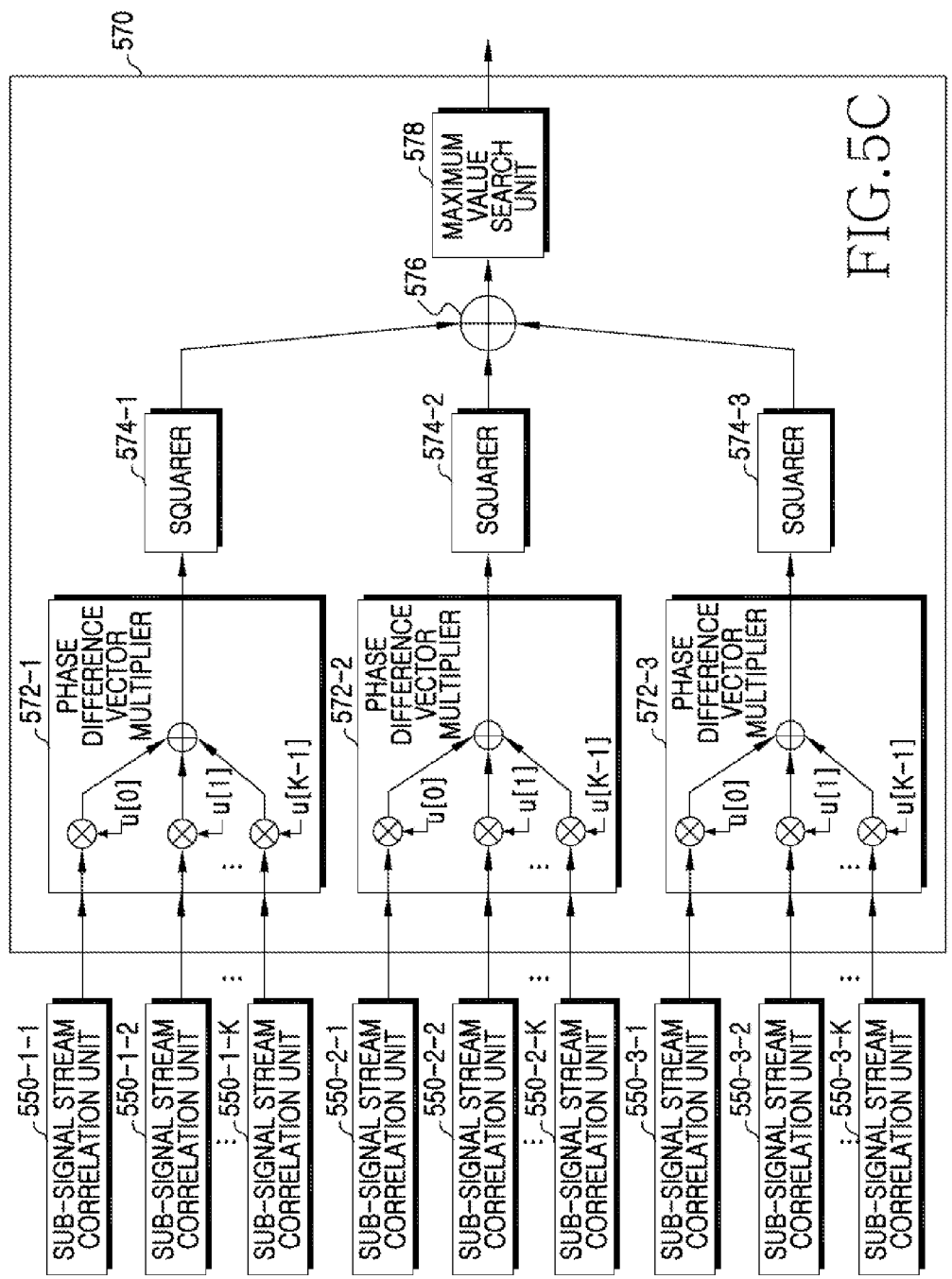

APPARATUS AND METHOD FOR TRANSMITTING AND RECEIVING INFORMATION THROUGH FAST FEEDBACK CHANNEL IN BROADBAND WIRELESS COMMUNICATION SYSTEM

PRIORITY

This application is a continuation of prior application Ser. No. 12/540,655, filed on Aug. 13, 2009, which claims the benefit under 35 U.S.C. §119(a) of a Korean patent application filed in the Korean Intellectual Property Office on Aug. 13, 2008 and assigned Serial No. 10-2008-0079418, a Korean patent application filed in the Korean Intellectual Property Office on Feb. 25, 2009 and assigned Serial No. 10-2009-0016051, and a Korean patent application filed in the Korean Intellectual Property Office on Mar. 5, 2009 and assigned Serial No. 10-2009-0019029, the entire disclosures of all of which are hereby incorporated by reference.

BACKGROUND OF THE INVENTION

1. Field of the Invention

The present invention relates to a broadband wireless communication system. More particularly, the present invention relates to an apparatus and method for transmitting/receiving information through a fast feedback channel having limited capacity in a broadband wireless communication system.

2. Description of the Related Art

Physical channels for transmitting UpLink (UL) fast feedback information are present in Orthogonal Frequency Division Multiple Access (OFDMA)-based communication systems. Examples of the UL fast feedback information may include a variety of information, such as, a Signal-to-Noise Ratio (SNR) or a Carrier-to-Interference Ratio (CIR), a Modulation and Coding Scheme (MCS) preferred by a Mobile Station (MS), information for selecting a Flexible Frequency Reuse (FFR), a beam forming index, and the like.

The UL fast feedback information is small but is significantly important for operating a communication system. Thus, high reliability has to be ensured when the UL fast feedback information is transmitted. However, to avoid a waste of resources, a physical channel for transmitting high speed feedback information is not allocated generally with a large amount of frequency-time resources. Therefore, an effective modulation/demodulation scheme is required for reliable transmission using limited resources.

The OFDMA-based communication systems generally use non-coherent modulation/demodulation to transmit and receive the UL fast feedback information. Signal streams orthogonal to each other are used for the non-coherent modulation/demodulation. Thus, there is a restriction on the number of bits of information that can be transmitted using limited frequency-time resources. In addition, since the same signal is transmitted using different frequency resources to obtain a frequency diversity gain, a resource loss is greater than an information bit loss.

As described above, the fast feedback information is necessary for system operation and thus demands high reliability. However, resource utility efficiency may decrease by the orthogonal signal streams for ensuring high reliability and by the use of a diversity scheme.

Therefore, a need exists for an apparatus and method for effectively using resources in a broadband wireless communication system while maintaining high reliability.

SUMMARY OF THE INVENTION

An aspect of the present invention is to address at least the above-mentioned problems and/or disadvantages and to provide at least the advantages described below. Accordingly, an aspect of the present invention is to provide an apparatus and method for effectively using a fast feedback channel having a limited capacity in a broadband wireless communication system.

Another aspect of the present invention is to provide an apparatus and method for transmitting and receiving quasi-orthogonal signal streams through a fast feedback channel in a broadband wireless communication system.

Still another aspect of the present invention is to provide an apparatus and method for utilizing a quasi-orthogonal signal stream group having correlation values less than or equal to a threshold in a broadband wireless communication system.

Yet another aspect of the present invention is to provide an apparatus and method for utilizing a quasi-orthogonal signal stream group consisting of an orthogonal sub-signal stream in a broadband wireless communication system.

A further aspect of the present invention is to provide an apparatus and method for utilizing a quasi-orthogonal signal stream group generated using orthogonal sub-signal streams and a phase difference vector in a broadband wireless communication system.

In accordance with an aspect of the present invention, a transmitting-end apparatus in a wireless communication system is provided. The apparatus includes a plurality of mappers for mapping a sequence, corresponding to an index to be fed back, to a first set of resource blocks in a fast feedback channel by using a first mapping pattern and to a second set of resource blocks in the fast feedback channel by using a second mapping pattern, and a transmitter for transmitting the sequence mapped to a plurality of sets of resource blocks, wherein the sequence is mapped to each of the plurality of sets of resource blocks, and wherein each element of the sequence is mapped to each resource block, wherein a mapping order of elements of the sequence in the first mapping pattern is different from a mapping order of elements of the sequence in the second mapping pattern, wherein the first set of resource blocks and second set of resource blocks have a predetermined same number of resource blocks each other, and wherein the first set of resource blocks is differently located from the second set of resource block in the fast feedback channel.

In accordance with another aspect of the present invention, a method for transmitting feedback information through a fast feedback channel in a wireless communication system is provided. The method includes mapping a sequence, corresponding to an index to be fed back, to a first set of resource blocks in a fast feedback channel by using a first mapping pattern and to a second set of resource blocks in the fast feedback channel by using a second mapping pattern, and transmitting the sequence mapped to a plurality of sets of resource blocks, wherein the sequence is mapped to each of the plurality of sets of resource blocks, and wherein each element of the sequence is mapped to each resource block, wherein a mapping order of elements of the sequence in the first mapping pattern is different from a mapping order of elements of the sequence in the second mapping pattern, wherein the first set of resource blocks and second set of resource blocks have a predetermined same number of resource blocks each other, and wherein the first set of resource blocks is differently located from the second set of resource block in the fast feedback channel.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 5A to 5C are block diagrams illustrating a structure of a receiving end in a broadband wireless communication system according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for effectively using a fast feedback channel with a limited capacity in a broadband wireless communication system.

Although an Orthogonal Frequency Division Multiplexing (OFDM)/Orthogonal Frequency Division Multiple Access (OFDMA)-based wireless communication system is described hereinafter for example, exemplary embodiments of the present invention may also apply to other types of wireless communication systems.

Figure 1:
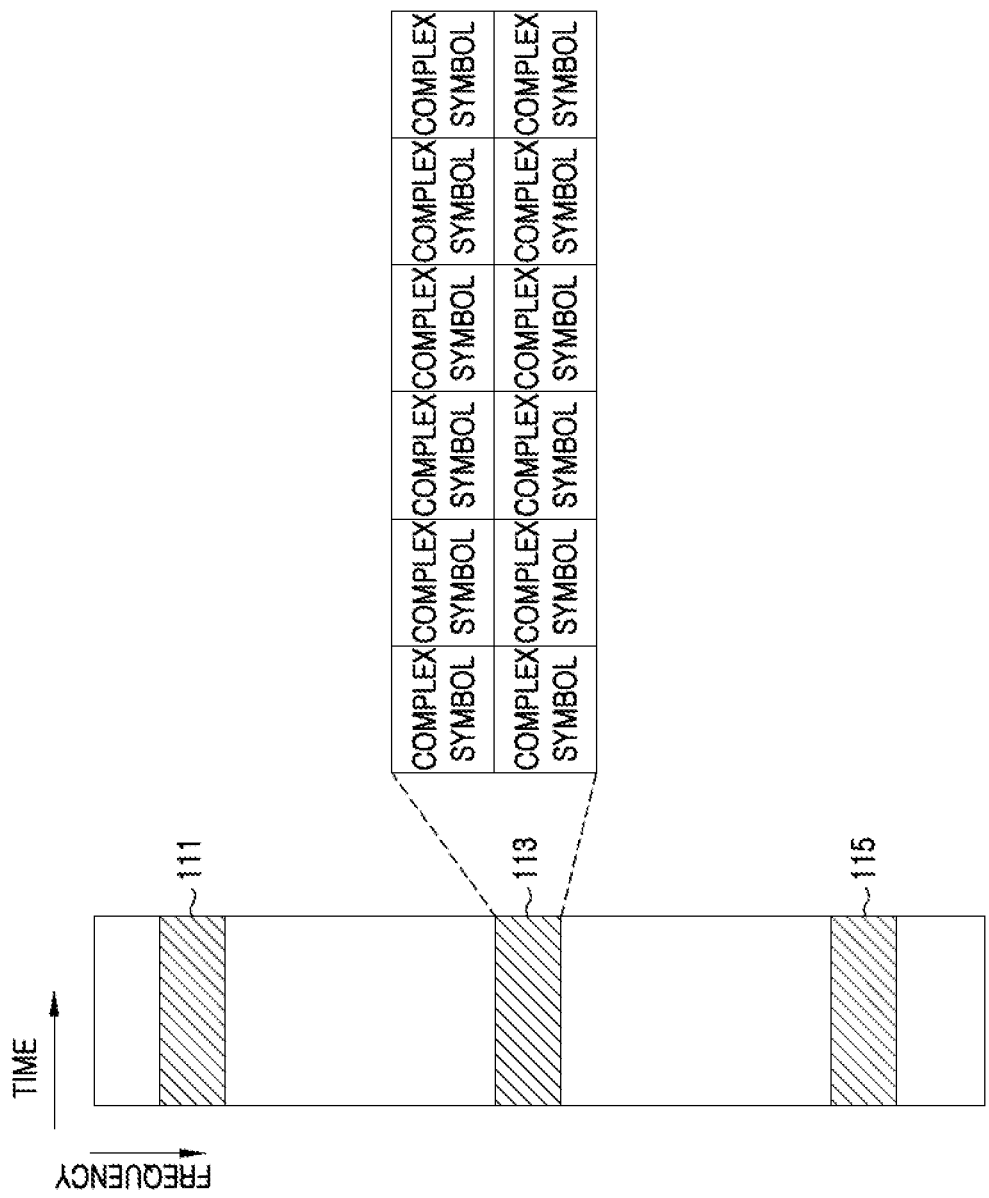
FIG. 1 illustrates an example of a structure of a high feedback channel in a broadband wireless communication system according to an exemplary embodiment of the present invention.

FIG. 1 illustrates an example of a structure of a high feedback channel in a broadband wireless communication system according to an exemplary embodiment of the present invention.

Referring to FIG. 1, the fast feedback channel consists of three sub-carrier bundles 111, 113 and 115, and each sub-carrier bundle ranges two sub-carriers and 6 OFDM symbols. That is, one sub-carrier bundle includes 12 modulation symbols. However, the present invention is not limited thereto and may also apply to wireless communication systems using other types of fast feedback channels.

A Transmit (Tx) signal stream for feedback is designed based on a single sub-carrier bundle. That is, when using the fast feedback channel having the format of FIG. 1, the Tx signal stream is designed based on 12 tones included in one sub-carrier bundle. When signal streams having perfect orthogonality are intended to be transmitted using the 12 tones, up to 12 orthogonal signal streams are available. For example, when M tones are usable, the orthogonal signal streams are generated as expressed by Equation (1) below.

$$C_i[m] = \exp[j2\pi i/M], 0 \le i, m \le M-1 \quad (1)$$

In Equation (1), $C_i[m]$ denotes an $(m+1)^{th}$ element of an $(i+1)^{th}$ orthogonal signal stream, and M denotes a length of an orthogonal signal stream.

The orthogonal signal streams generated by Equation (1) above generally have an M-ary Phase Shift Keying (PSK) modulation format. When the length M of the orthogonal stream has a specific pattern such as a multiple of 4, the generated orthogonal signal stream may have a Quadrature Phase Shift Keying (QPSK) or Binary Phase Shift Keying (BPSK) modulation format.

When using the orthogonal signal stream having a length of M, a number of bits of feedback information is limited to $\log_2 M$. Therefore, in a case where the number of bits of the feedback information needs to be increased, perfect orthogonality is abandoned between signal streams. Accordingly, an exemplary embodiment of the present invention proposes a signal stream group designed such that a correlation value between all possible signal stream pairs is less than or equal to a threshold while abandoning perfect orthogonality. That is, in order to maximize asynchronous detection performance of a receiving end, an exemplary embodiment of the present invention maintains a correlation value between any different signal streams belonging to a quasi-orthogonal signal stream group to a minimum level. The correlation value between the signal streams may be expressed by Equation (2) below.

$$\rho_{ik} = \left| \sum_{m=0}^{M-1} C_i[m] C_k^*[m] \right| \quad (2)$$

In Equation (2), $\rho_{ik}$ denotes a correlation value between an $i^{th}$ signal stream and a $k^{th}$ signal stream, $C_i[m]$ denotes an $(m+1)^{th}$ element of an $i^{th}$ signal stream, and M denotes a length of a signal stream.

The quasi-orthogonal signal stream group is designed differently according to the number of bits of feedback information, i.e., the number of codewords of the feedback information. Accordingly, an exemplary embodiment of the present invention describes an example of a quasi-orthogonal signal stream group capable of indicating 64 codewords by using a signal stream having a length of 12.

The quasi-orthogonal signal stream group capable of indicating the 64 codewords is generated as follows.

In the quasi-orthogonal signal stream group capable of indicating the 64 codewords, a correlation value between different signal streams is maintained to be less than or equal to 4. The signal stream having a length of 12 consists of three sub-signal streams having a length of 4. In this case, each sub-signal stream is one of the orthogonal signal streams having a length of 4. The orthogonal signal streams having a length of 4 may be generated using a 4-point Discrete Fourier Transform (DFT) as illustrated in Equation (1) above, or may be generated using a Hadamard code as illustrated in Equation (3) below.

$$v_0 = [1,1,1,1]$$

$$v_1 = [1,-1,1,-1]$$

$$v_2 = [1,1,-1,-1]$$

$$v_3 = [1,-1,-1,1] \quad (3)$$

In Equation (3), $v_k$ denotes a (k+1)th orthogonal sub-signal stream.

If two different quasi-orthogonal signal streams have only one identical orthogonal sub-signal stream, a correlation value between the quasi-orthogonal signal streams does not exceed 4, i.e., a length of a sub-signal stream. An orthogonal sub-signal stream group having the above characteristic may be generated by using a Reed-Solomon (RS) code whose alphabet is each orthogonal sub-signal stream and which has a minimum Hamming distance of 2 and a Galois Field (GF) of 4. That is, 16 quasi-orthogonal signal streams as illustrated in Equation (4) below are generated from the orthogonal signal streams as illustrated in Equation (3) above.

$$\begin{bmatrix} (v_0, v_0, v_0) & (v_0, v_1, v_2) & (v_0, v_2, v_3) & (v_0, v_3, v_1) \\ (v_1, v_2, v_0) & (v_2, v_3, v_1) & (v_3, v_1, v_0) & (v_2, v_0, v_1) \\ (v_3, v_0, v_2) & (v_1, v_0, v_3) & (v_1, v_3, v_2) & (v_2, v_1, v_3) \\ (v_3, v_2, v_1) & (v_1, v_1, v_1) & (v_2, v_2, v_2) & (v_3, v_3, v_3) \end{bmatrix} \quad (4)$$

In Equation (4), $v_k$ denotes a (k+1)th orthogonal sub-signal stream.

Each orthogonal sub-signal stream constituting the quasi-orthogonal signal streams as illustrated in Equation (4) corresponds to the same frequency-time resource bundle. Therefore, unlike in the RS code that maintains only the minimum Hamming distance, an additional phase difference is applied to a sub-signal stream to increase the number of quasi-orthogonal signal streams while maintaining a correlation value between the quasi-orthogonal signal streams. For example, a phase difference vector for providing an additional phase difference is expressed by Equation (5) below.

$$u_0 = (1,1,1)$$

$$u_1 = (1,1,-1)$$

$$u_2 = (1,-1,1)$$

$$u_3 = (1,-1,-1) \quad (5)$$

In Equation (5), $u_k$ denotes a (k+1)th phase difference vector.

Phase difference vectors as illustrated in Equation (5) above are respectively applied to quasi-orthogonal signal streams as illustrated in Equation (4) to obtain a quasi-orthogonal signal stream group capable of expressing 64 codewords as illustrated in Equation (6) below.

$$(p_1, p_2, p_3) = \begin{bmatrix} (v_l, v_m, v_n) \\ (v_l, v_m, -v_n) \\ (v_l, -v_m, v_n) \\ (v_l, -v_m, -v_n) \end{bmatrix} \quad (6)$$

In Equation (6), $(p_1, p_2, p_3)$ denotes a quasi-orthogonal signal stream, $v_l$ denotes an $l^{th}$ orthogonal sub-signal stream, $v_m$ denotes an $m^{th}$ orthogonal sub-signal stream, and $v_n$ denotes an $n^{th}$ orthogonal sub-signal stream. Herein, a combination of (l,m,n) is one of combinations constituting the signal stream of Equation (4) above.

In the quasi-orthogonal signal stream group generated as illustrated in Equation (6) above, the product between different phase difference vectors includes at least one different sign, i.e., '+' or '−', and thus a correlation value between quasi-orthogonal signal streams is maintained to be less than or equal to 4 regardless of which orthogonal sub-signal stream is selected. Table 1 below illustrates an example of a mapping relation between a quasi-orthogonal signal stream group based on the above generation scheme and a 6-bit fast feedback information bit.

TABLE 1

| codeword | index of sub-signal stream (l, m, n) | phase difference vector (BPSK) | signal stream (BPSK) |
|---|---|---|---|
| 0b000000 | (0, 0, 0) | (1, 1, 1) | 111111111111 |
| 0b000001 | (0, 0, 0) | (1, −1, 1) | 111100001111 |
| 0b000010 | (0, 0, 0) | (1, 1, −1) | 111111110000 |
| 0b000011 | (0, 0, 0) | (1, −1, −1) | 111100000000 |
| 0b000100 | (0, 1, 2) | (1, 1, 1) | 111111001001 |
| 0b000101 | (0, 1, 2) | (1, −1, 1) | 111100111001 |
| 0b000110 | (0, 1, 2) | (1, 1, −1) | 111111000110 |
| 0b000111 | (0, 1, 2) | (1, −1, −1) | 111100110110 |
| 0b001000 | (0, 2, 3) | (1, 1, 1) | 111100111010 |
| 0b001001 | (0, 2, 3) | (1, −1, 1) | 111101101010 |
| 0b001010 | (0, 2, 3) | (1, 1, −1) | 111110010101 |
| 0b001011 | (0, 2, 3) | (1, −1, −1) | 111101100101 |
| 0b001100 | (0, 3, 1) | (1, 1, 1) | 111110101100 |
| 0b001101 | (0, 3, 1) | (1, −1, 1) | 111101011100 |
| 0b001110 | (0, 3, 1) | (1, 1, −1) | 111110100011 |
| 0b001111 | (0, 3, 1) | (1, −1, −1) | 111101010011 |
| 0b010000 | (1, 2, 0) | (1, 1, 1) | 110010011111 |
| 0b010001 | (1, 2, 0) | (1, −1, 1) | 110001101111 |
| 0b010010 | (1, 2, 0) | (1, 1, −1) | 110010010000 |

TABLE 1-continued

| codeword | index of sub-signal stream (l, m, n) | phase difference vector (BPSK) | signal stream (BPSK) |
|---|---|---|---|
| 0b010011 | (1, 2, 0) | (1, −1, −1) | 110001100000 |
| 0b010100 | (2, 3, 0) | (1, 1, 1) | 100110101111 |
| 0b010101 | (2, 3, 0) | (1, −1, 1) | 100101011111 |
| 0b010110 | (2, 3, 0) | (1, 1, −1) | 100110000000 |
| 0b010111 | (2, 3, 0) | (1, −1, −1) | 100101010000 |
| 0b011000 | (3, 1, 0) | (1, 1, 1) | 101011001111 |
| 0b011001 | (3, 1, 0) | (1, −1, 1) | 101000111111 |
| 0b011010 | (3, 1, 0) | (1, 1, −1) | 101011000000 |
| 0b011011 | (3, 1, 0) | (1, −1, −1) | 101000110000 |
| 0b011100 | (2, 0, 1) | (1, 1, 1) | 100111111100 |
| 0b011101 | (2, 0, 1) | (1, −1, 1) | 100100001100 |
| 0b011110 | (2, 0, 1) | (1, 1, −1) | 100111110011 |
| 0b011111 | (2, 0, 1) | (1, −1, −1) | 100100000011 |
| 0b100000 | (3, 0, 2) | (1, 1, 1) | 101011111001 |
| 0b100001 | (3, 0, 2) | (1, −1, 1) | 101000001001 |
| 0b100010 | (3, 0, 2) | (1, 1, −1) | 101011110110 |
| 0b100011 | (3, 0, 2) | (1, −1, −1) | 101000000110 |
| 0b100100 | (1, 0, 3) | (1, 1, 1) | 110011111010 |
| 0b100101 | (1, 0, 3) | (1, −1, 1) | 110000001010 |
| 0b100110 | (1, 0, 3) | (1, 1, −1) | 110011110101 |
| 0b100111 | (1, 0, 3) | (1, −1, −1) | 110000000101 |
| 0b101000 | (1, 3, 2) | (1, 1, 1) | 110010101001 |
| 0b101001 | (1, 3, 2) | (1, −1, 1) | 110001011001 |
| 0b101010 | (1, 3, 2) | (1, 1, −1) | 110010100110 |
| 0b101011 | (1, 3, 2) | (1, −1, −1) | 110001010110 |
| 0b101100 | (2, 1, 3) | (1, 1, 1) | 100111001010 |
| 0b101101 | (2, 1, 3) | (1, −1, 1) | 100100111010 |
| 0b101110 | (2, 1, 3) | (1, 1, −1) | 100111000101 |
| 0b101111 | (2, 1, 3) | (1, −1, −1) | 100100110101 |
| 0b110000 | (3, 2, 1) | (1, 1, 1) | 101010110011 |
| 0b110001 | (3, 2, 1) | (1, −1, 1) | 101001101100 |
| 0b110010 | (3, 2, 1) | (1, 1, −1) | 101010010011 |
| 0b110011 | (3, 2, 1) | (1, −1, −1) | 101001100011 |
| 0b110100 | (1, 1, 1) | (1, 1, 1) | 110011001100 |
| 0b110101 | (1, 1, 1) | (1, −1, 1) | 110000111100 |
| 0b110110 | (1, 1, 1) | (1, 1, −1) | 110011000011 |
| 0b110111 | (1, 1, 1) | (1, −1, −1) | 110000110011 |
| 0b111000 | (2, 2, 2) | (1, 1, 1) | 100110011001 |
| 0b111001 | (2, 2, 2) | (1, −1, 1) | 100101101001 |
| 0b111010 | (2, 2, 2) | (1, 1, −1) | 100110010110 |
| 0b111011 | (2, 2, 2) | (1, −1, −1) | 100101100110 |
| 0b111100 | (3, 3, 3) | (1, 1, 1) | 101010101010 |
| 0b111101 | (3, 3, 3) | (1, −1, 1) | 101001011010 |
| 0b111110 | (3, 3, 3) | (1, 1, −1) | 101010100101 |
| 0b111111 | (3, 3, 3) | (1, −1, −1) | 101001010101 |

In quasi-orthogonal signal streams shown in Table 1 above, a mapping relation between a codeword and a quasi-orthogonal signal stream may change depending on an environment. More particularly, in a case where a quasi-orthogonal signal stream capable of representing up to 6-bit information intends to minimize a correlation value between quasi-orthogonal signal streams with respect to 4-bit or 5-bit information, an order of Reed-Solomon mapping of Equation (4) above is modified as illustrated in Equation (7) below.

$$\begin{bmatrix} (v_0, v_0, v_0) & (v_1, v_1, v_1) & (v_2, v_2, v_2) & (v_3, v_3, v_3) \\ (v_0, v_1, v_2) & (v_1, v_0, v_3) & (v_2, v_3, v_0) & (v_3, v_2, v_1) \\ (v_1, v_3, v_2) & (v_3, v_1, v_0) & (v_0, v_2, v_3) & (v_2, v_0, v_1) \\ (v_1, v_2, v_0) & (v_2, v_0, v_1) & (v_2, v_1, v_3) & (v_3, v_0, v_2) \end{bmatrix} \quad (7)$$

In Equation (7), $v_k$ denotes a $(k+1)^{th}$ orthogonal sub-signal stream.

When quasi-orthogonal signal streams are configured by Equation (7) above, the quasi-orthogonal signal streams are expressed by Table 2 below.

TABLE 2

| codeword | signal stream (BPSK) |
|---|---|
| 0b000000 | 111111111111 |
| 0b000001 | 111100001111 |
| 0b000010 | 111111110000 |
| 0b000011 | 111100000000 |
| 0b000100 | 101010101010 |
| 0b000101 | 101001011010 |
| 0b000110 | 101010100101 |
| 0b000111 | 101001010101 |
| 0b001000 | 110011001100 |
| 0b001001 | 110000111100 |
| 0b001010 | 110011000011 |
| 0b001011 | 110000110011 |
| 0b001100 | 100110011001 |
| 0b001101 | 100101101001 |
| 0b001110 | 100110010110 |
| 0b001111 | 100101100110 |
| 0b010000 | 111110101100 |
| 0b010001 | 111101011100 |
| 0b010010 | 111110100011 |
| 0b010011 | 111101010011 |
| 0b010100 | 101011111001 |
| 0b010101 | 101000001001 |
| 0b010110 | 101011110110 |
| 0b010111 | 101000000110 |
| 0b011000 | 110010011111 |
| 0b011001 | 110001101111 |
| 0b011010 | 110010010000 |
| 0b011011 | 110001100000 |
| 0b011100 | 100111001010 |
| 0b011101 | 100100111010 |
| 0b011110 | 100111000101 |
| 0b011111 | 100100110101 |
| 0b100000 | 101010011100 |
| 0b100001 | 101001101100 |
| 0b100010 | 101010010011 |
| 0b100011 | 101001100011 |
| 0b100100 | 100110101111 |
| 0b100101 | 100101011111 |
| 0b100110 | 100110100000 |
| 0b100111 | 100101010000 |
| 0b101000 | 111111001001 |
| 0b101001 | 111100111001 |
| 0b101010 | 111111000110 |
| 0b101011 | 111100110110 |
| 0b101100 | 111110011010 |
| 0b101101 | 111101101010 |
| 0b101110 | 111110010101 |
| 0b101111 | 111101100101 |
| 0b110000 | 101011001111 |
| 0b110001 | 101000111111 |
| 0b110010 | 101011000000 |
| 0b110011 | 101000110000 |
| 0b110100 | 110011111010 |
| 0b110101 | 110000001010 |
| 0b110110 | 110011110101 |
| 0b110111 | 110000000101 |
| 0b111000 | 110010101001 |
| 0b111001 | 110001011001 |
| 0b111010 | 110010100110 |
| 0b111011 | 110001010110 |
| 0b111100 | 100111111100 |
| 0b111101 | 100100001100 |
| 0b111110 | 100111110011 |
| 0b111111 | 100100000011 |

If 4-bit information is intended to be transmitted using the quasi-orthogonal signal streams shown in Table 2 above, a Mobile Station (MS) uses only 16 quasi-orthogonal signal streams, i.e., 0b000000 to 0b001111, among 64 quasi-orthogonal signal streams in total. On the other hand, if 5-bit information is intended to be transmitted, the MS uses only 32 quasi-orthogonal signal streams, i.e., 0b000000 to 0b011111. In addition, a correlation property is maintained even if a mapping relation between a quasi-orthogonal signal stream and a codeword with respect to 16 signal stream groups of {0b000000 to 0b001111} and {0b010000 to 0b011111} and the remaining 32 signal stream groups is arbitrarily modified within each signal stream group.

The mapping relation between the codeword and the signal stream of Table 1 above is modified to a mapping relation as shown in Table 2 above in order to transmit 4-bit and 5-bit information. In Table 2, the same generation process as for all signal stream groups is used.

Even if the mapping relation of codewords and signal streams shown in Table 1 and Table 2 above is newly defined, a correlation relation and a property of a maximum correlation value are maintained. Defining a new mapping relation is to change a method of mapping a signal stream to a time-frequency resource. In this case, a property of the signal stream does not change, but reception performance may vary in an environment where a given time-frequency resource cannot have the same channel gain due to high-speed movement, time and frequency errors, and the like. Table 3 below shows a signal stream obtained by rearranging the signal stream of Table 2 to have a more robust property in a fast movement environment.

TABLE 3

| codeword | signal stream (BPSK) |
|---|---|
| 0b000000 | 111111111111 |
| 0b000001 | 101111010110 |
| 0b000010 | 011010111101 |
| 0b000011 | 001010010100 |
| 0b000100 | 110011001100 |
| 0b000101 | 100011100101 |
| 0b000110 | 010110001110 |
| 0b000111 | 000110100111 |
| 0b001000 | 100110011001 |
| 0b001001 | 110110110000 |
| 0b001010 | 000011011011 |
| 0b001011 | 010011110010 |
| 0b001100 | 101010101010 |
| 0b001101 | 111010000011 |
| 0b001110 | 001111101000 |
| 0b001111 | 011111000001 |
| 0b010000 | 111110011100 |
| 0b010001 | 101110110101 |
| 0b010010 | 011101011110 |
| 0b010011 | 001011110111 |
| 0b010100 | 110010101111 |
| 0b010101 | 100010000110 |
| 0b010110 | 010111101101 |
| 0b010111 | 000111000100 |
| 0b011000 | 100111111010 |
| 0b011001 | 110111010011 |
| 0b011010 | 000010111000 |
| 0b011011 | 010010010001 |
| 0b011100 | 101011001001 |
| 0b011101 | 111011100000 |
| 0b011110 | 001110001011 |
| 0b011111 | 011110100010 |
| 0b100000 | 100110101100 |
| 0b100001 | 110110000101 |
| 0b100010 | 000011101110 |
| 0b100011 | 010011000111 |
| 0b100100 | 111111001010 |
| 0b100101 | 101111100011 |
| 0b100110 | 011010001000 |
| 0b100111 | 001010100001 |
| 0b101000 | 101010011111 |
| 0b101001 | 111010110110 |
| 0b101010 | 001111011101 |
| 0b101011 | 011111110100 |
| 0b101100 | 101011111100 |
| 0b101101 | 111011010101 |
| 0b101110 | 001110111110 |
| 0b101111 | 011110010111 |
| 0b110000 | 100111001111 |

TABLE 3-continued

| codeword | signal stream (BPSK) |
|---|---|
| 0b110001 | 110111100110 |
| 0b110010 | 000010001101 |
| 0b110011 | 010010100100 |
| 0b110100 | 110011111001 |
| 0b110101 | 100011010000 |
| 0b110110 | 010110111011 |
| 0b110111 | 000110010010 |
| 0b111000 | 110010011010 |
| 0b111001 | 100010110011 |
| 0b111010 | 010111011000 |
| 0b111011 | 000111110001 |
| 0b111100 | 111110101001 |
| 0b111101 | 101110000000 |
| 0b111110 | 011011101011 |
| 0b111111 | 001011000010 |

Hereinafter, structures of a transmitting end and a receiving end which use a quasi-orthogonal signal stream group generated as described above will be described with reference to the accompanying drawings.

Figure 3:
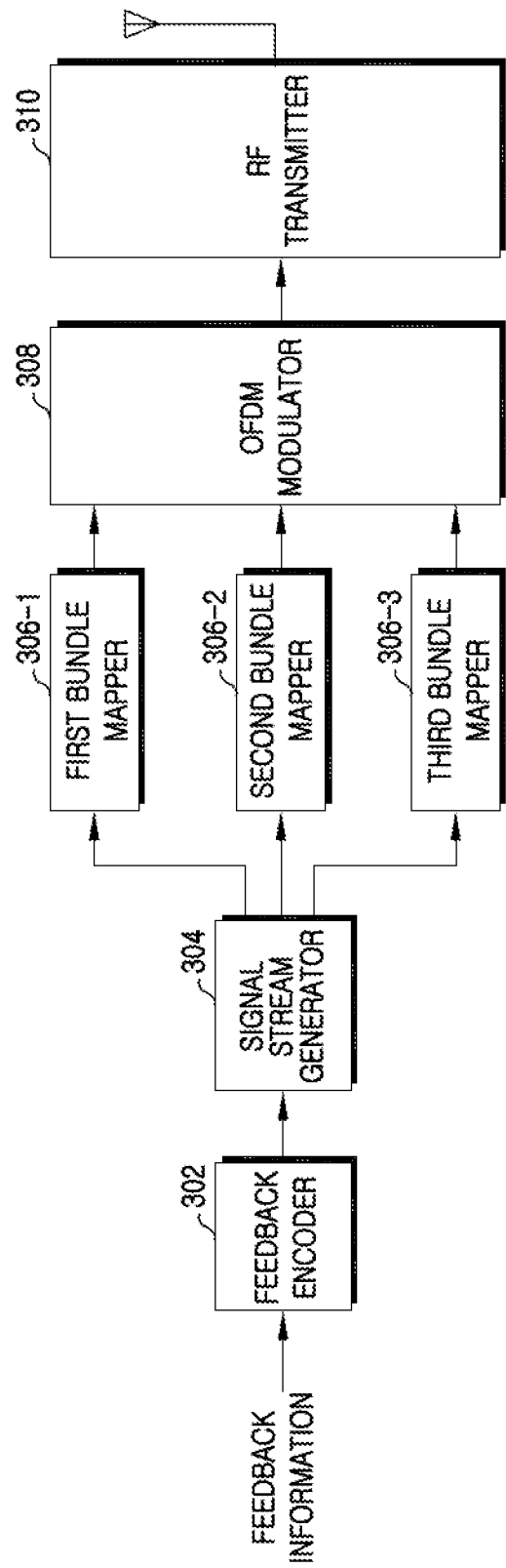
FIG. 3 is a block diagram illustrating a structure of a transmitting end in a broadband wireless communication system according to an exemplary embodiment of the present invention.

FIG. 3 is a block diagram illustrating a structure of a transmitting end in a broadband wireless communication system according to an exemplary embodiment of the present invention.

Referring to FIG. 3, the transmitting end includes a feedback encoder 302, a signal stream generator 304, a plurality of bundle mappers 306-1 to 306-3, an OFDM modulator 308 and a Radio Frequency (RF) transmitter 310.

The feedback encoder 302 converts information to be fed back through a fast feedback channel into a codeword. That is, the feedback encoder 302 converts the information to be fed back into the codeword according to a predefined rule.

The signal stream generator 304 receives the codeword from the feedback encoder 302 and generates a quasi-orthogonal signal stream corresponding to the codeword. In this case, the quasi-orthogonal signal stream is determined by a predefined mapping relation between a codeword and the quasi-orthogonal signal stream. In addition, the quasi-orthogonal signal stream has a format that differs depending on a design rule of the quasi-orthogonal signal stream. Herein, the design rule includes a threshold of a correlation value between different quasi-orthogonal signal streams, the number of codewords to be used, and the like. For example, the format of the quasi-orthogonal signal stream and the mapping relation between the codeword and the quasi-orthogonal signal stream are shown in Table 2 and Table 3 above. That is, signal stream generator 304 stores a predefined quasi-orthogonal signal stream group and information on the mapping relation between the codeword and the quasi-orthogonal signal stream, evaluates a quasi-orthogonal signal stream corresponding to a codeword provided from the feedback encoder 302, and generates the quasi-orthogonal signal stream consisting of complex symbols.

Figure 2A:
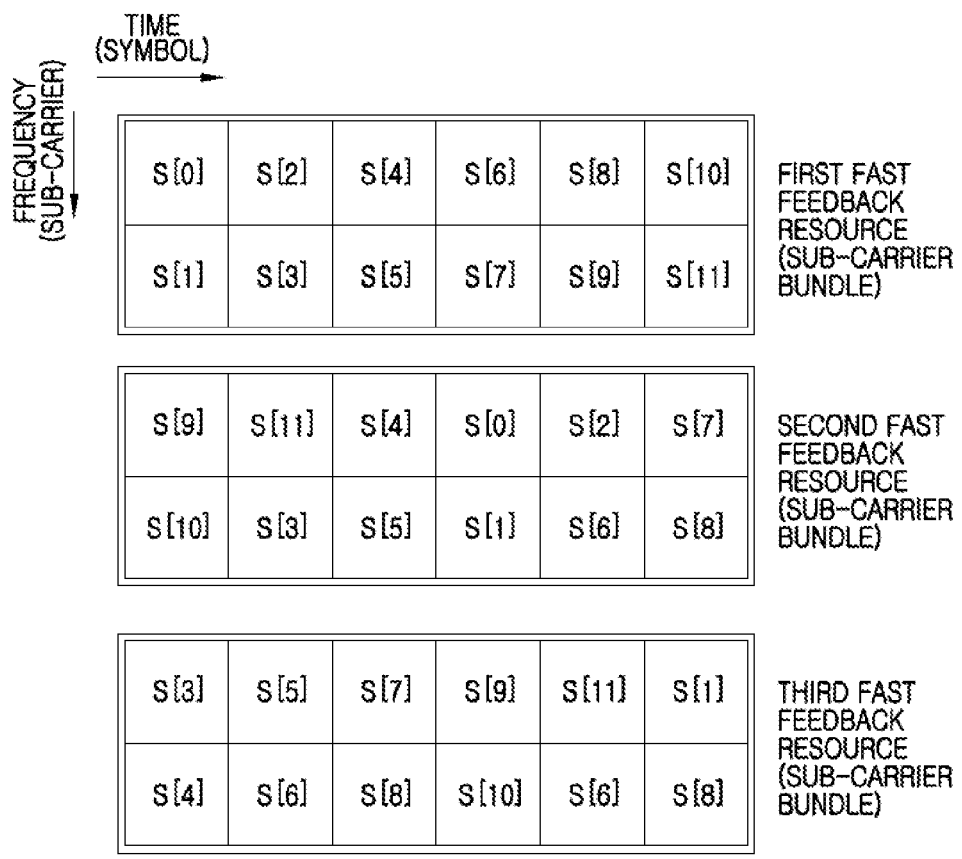
FIGS. 2A and 2B illustrate examples of a method for mapping a quasi-orthogonal signal stream in a broadband wireless communication system according to an exemplary embodiment of the present invention.
Figure 2B:
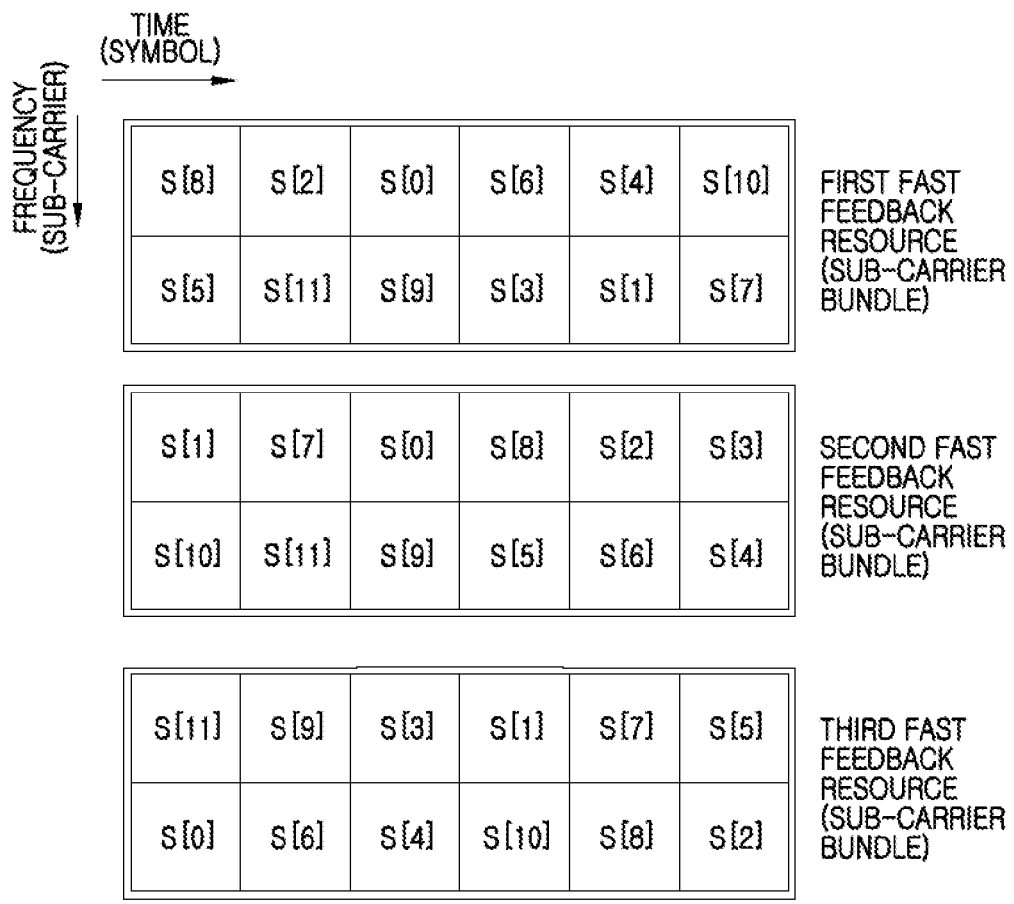

The bundle mappers 306-1 to 306-3 map the quasi-orthogonal signal stream provided from the signal stream generator 304 to each bundle in the fast feedback channel. In this case, the bundle mappers 306-1 to 306-3 map the quasi-orthogonal signal stream so that one orthogonal sub-signal stream is located in physically contiguous tones. Further, the bundle mappers 306-1 to 306-3 map the quasi-orthogonal signal stream so that orthogonal sub-signal streams are arranged in different orders in each bundle. That is, each of the bundle mappers 306-1 to 306-3 arranges orthogonal sub-signal streams constituting the quasi-orthogonal signal stream in different orders while mapping the same quasi-orthogonal signal stream to a corresponding bundle. For example, when using the signal stream of Table 3 above, the bundle mappers 306-1 to 306-3 map quasi-orthogonal signal streams as illustrated in FIG. 2A above. Such a mapping method is the same as a method of mapping quasi-orthogonal signal streams as illustrated in FIG. 2B above by using the signal stream of Table 2 above.

The OFDM modulator 308 converts signals mapped by the bundle mappers 306-1 to 306-3 into time-domain signals by performing an Inverse Fast Fourier Transform (IFFT) operation, and configures OFDM symbols by inserting a Cyclic Prefix (CP). The RF transmitter 310 up-converts the OFDM symbols provided from the OFDM modulator 308 into an RF signal and then transmits the RF signal through an antenna.

Figure 4:
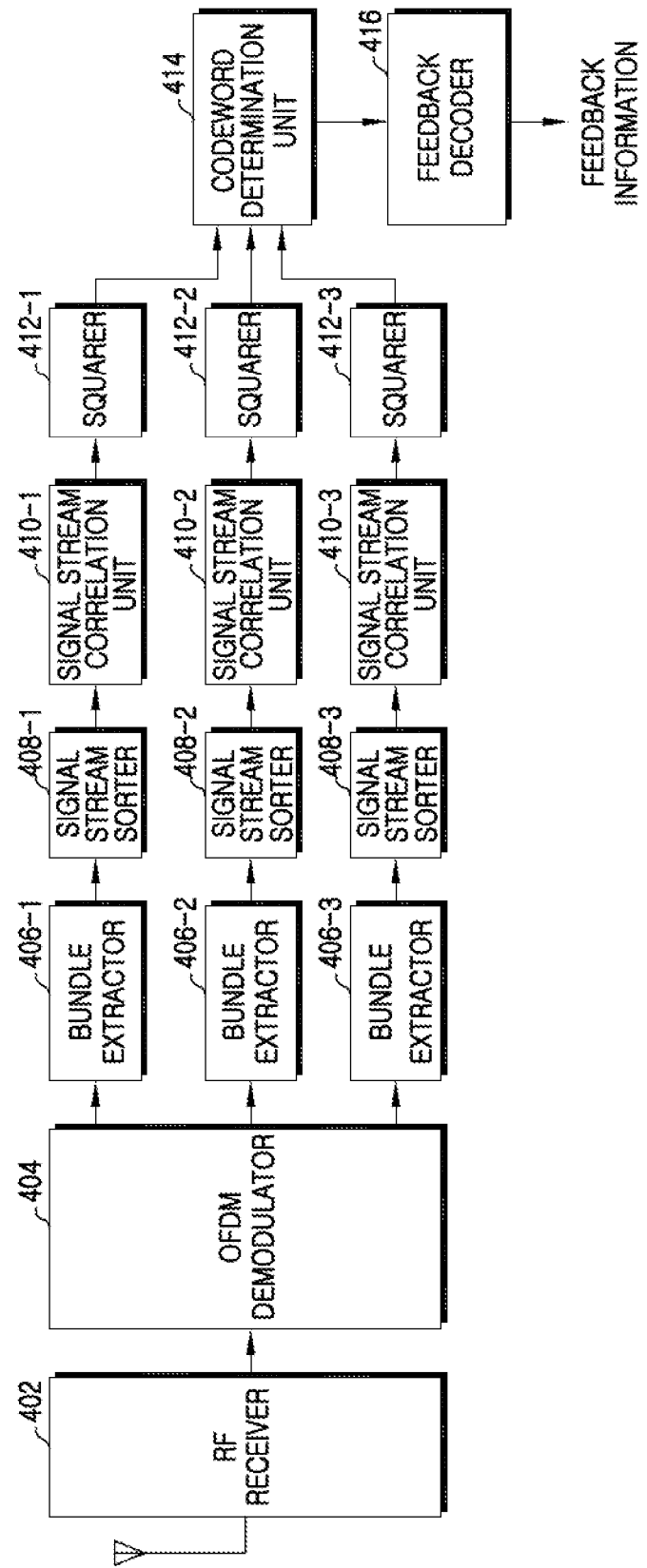
FIG. 4 is a block diagram illustrating a structure of a receiving end in a broadband wireless communication system according to an exemplary embodiment of the present invention.

FIG. 4 is a block diagram illustrating a structure of a receiving end in a broadband wireless communication system according to an exemplary embodiment of the present invention.

Referring to FIG. 4, the receiving end includes an RF receiver 402, an OFDM demodulator 404, a plurality of bundle extractors 406-1 to 406-3, a plurality of signal stream sorters 408-1 to 408-3, a plurality of signal stream correlation units 410-1 to 410-3, a plurality of squarers 412-1 to 412-3, a codeword determination unit 414 and a feedback decoder 416.

The RF receiver 402 converts an RF signal received through an antenna into a baseband signal. The OFDM demodulator 404 divides a signal provided from the RF receiver 402 in an OFDM symbol unit, removes a CP and then restores complex symbols mapped to a frequency domain by performing a Fast Fourier Transform (FFT) operation.

The bundle extractors 406-1 to 406-3 extract complex symbols mapped to a fast feedback channel. In this case, each of the bundle extractors 406-1 to 406-3 extracts complex symbols mapped to a bundle managed by each bundle extractor. For example, if the fast feedback channel has a format as illustrated in FIG. 1, the bundle extractor 406-1 extracts complex symbols mapped to a first bundle 111, the bundle extractor 406-2 extracts complex symbols mapped to a second bundle 113, and the bundle extractor 406-3 extracts complex symbols mapped to a third bundle 115, Although complex symbols mapped to each bundle are elements of the same quasi-orthogonal signal stream, the elements of the quasi-orthogonal signal stream may be arranged differently depending on a bundle.

The signal stream sorters 408-1 to 408-3 sort complex symbols provided for each bundle from the bundle extractors 406-1 to 406-3. In other words, the signal stream sorters 408-1 to 408-3 sort complex symbols extracted from each bundle in a format used before mapping and thus configure unmapped quasi-orthogonal signal streams. The quasi-orthogonal signal stream is decomposed in an orthogonal sub-signal stream unit by a transmitting end, and then is mapped to a predefined pattern that differs depending on a bundle. Therefore, each of the signal stream sorters 408-1 to 408-3 sorts complex symbols according to a mapping pattern of a bundle managed by each signal stream sorter. For example, the mapping pattern of each bundle is illustrated in FIG. 2A or FIG. 2B.

The signal stream correlation units 410-1 to 410-3 determine correlation values between candidate quasi-orthogonal signal streams and a quasi-orthogonal signal stream received according to each bundle. Herein, the candidate quasi-orthogonal signal streams include all available quasi-orthogonal signal streams. That is, the signal stream correlation units 410-1 to 410-3 store a list of the candidate quasi-orthogonal signal streams. Upon receiving the quasi-orthogonal signal stream, each of the signal stream correlation units 410-1 to 410-3 performs a correlation operation between each of the candidate quasi-orthogonal signal streams and the quasi-orthogonal signal stream received according to a bundle managed by each signal stream correlation unit. For example, the correlation operation is performed as illustrated in Equation (2) above. Therefore, each of the signal stream correlation units 410-1 to 410-3 outputs correlation values as many as the number of candidate quasi-orthogonal signal streams. The squarers 412-1 to 412-3 determine square values of the correlation values provided from the signal stream correlation units 410-1 to 410-3.

By using the square values provided from the squarers 412-1 to 412-3, the codeword determination unit 414 determines a quasi-orthogonal signal stream transmitted by the transmitting end. For this, the codeword determination unit 414 sums square correlation values derived from the same candidate quasi-orthogonal signal stream. Accordingly, the number of the determined square correlation values is equal to the number of candidate quasi-orthogonal signal streams. Thereafter, the codeword determination unit 414 searches for a maximum value among the sums of the square correlation values and determines that a quasi-orthogonal signal stream corresponding to the maximum value is transmitted. The codeword determination unit 414 outputs a codeword corresponding to the quasi-orthogonal signal stream corresponding to the maximum value. The feedback decoder 416 analyzes the codeword to evaluate control information expressed by the codeword.

Figure 5A:
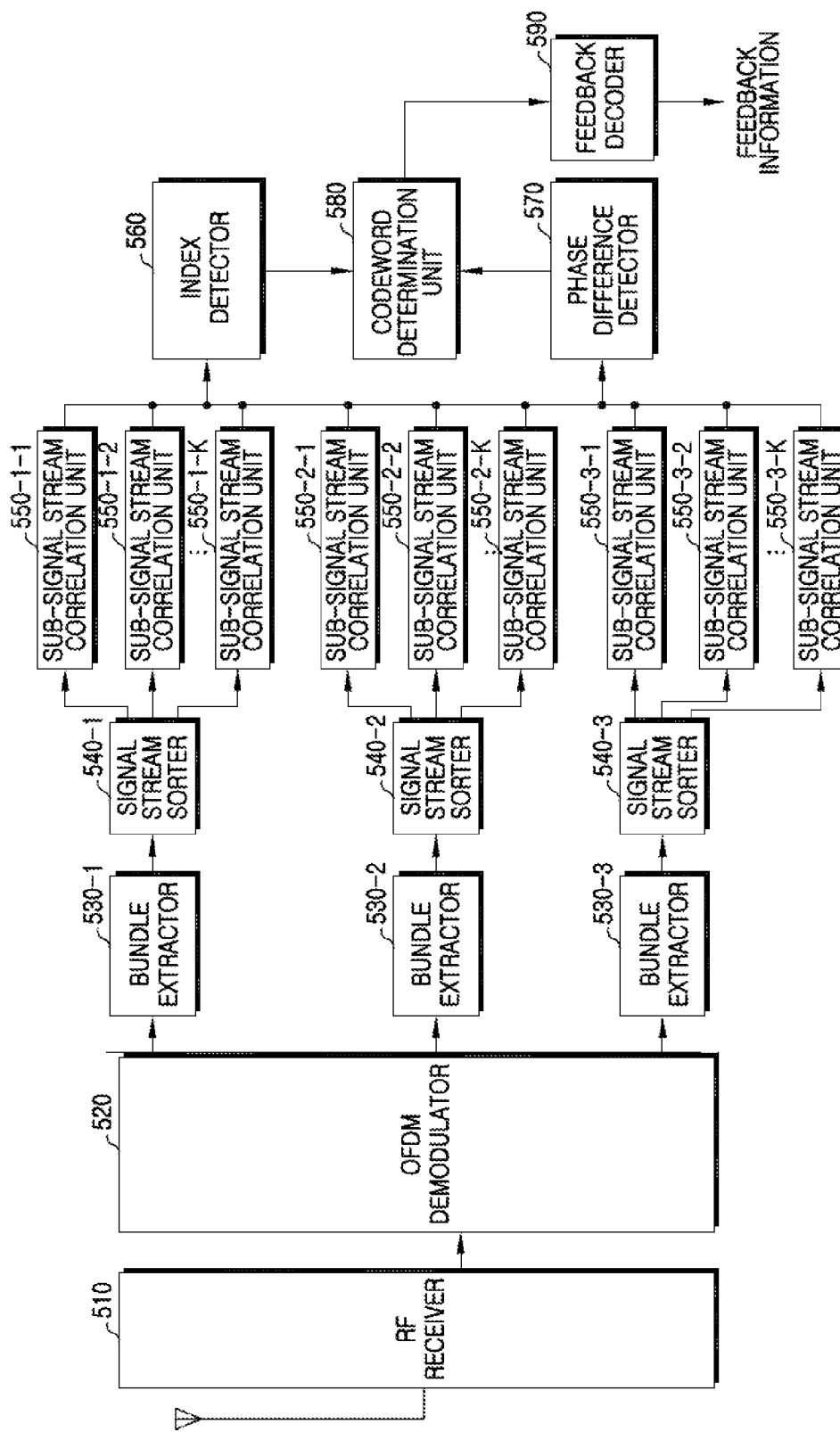

FIG. 5A is a block diagram illustrating a structure of a receiving end in a broadband wireless communication system according to an exemplary embodiment of the present invention.

Referring to FIG. 5A, the receiving end includes an RF receiver 510, an OFDM demodulator 520, a plurality of bundle extractors 530-1 to 530-3, a plurality of signal stream sorters 540-1 to 540-3, a plurality of sub-signal stream correlation units 550-1-1 to 550-3-K, an index detector 560, a phase difference detector 570, a codeword determination unit 580 and a feedback decoder 590.

The RF receiver 510 converts an RF signal received through an antenna into a baseband signal. The OFDM demodulator 520 divides a signal provided from the RF receiver 510 in an OFDM symbol unit, removes a CP and then restores complex symbols mapped to a frequency domain by performing an FFT operation.

The bundle extractors 530-1 to 530-3 extract complex symbols mapped to a fast feedback channel. In this case, each of the bundle extractors 530-1 to 530-3 extracts complex symbols mapped to a bundle managed by each bundle extractor. For example, if the fast feedback channel has a format as illustrated in FIG. 1, the bundle extractor 530-1 extracts complex symbols mapped to a first bundle 111, the bundle extractor 530-2 extracts complex symbols mapped to a second bundle 113 and the bundle extractor 530-3 extracts complex symbols mapped to a third bundle 115. Although complex symbols mapped to each bundle are elements of the same quasi-orthogonal signal stream, the elements of the quasi-orthogonal signal stream may be arranged differently depending on a bundle.

Each of the signal stream sorters 540-1 to 540-3 sorts complex symbols respectively provided from the bundle extractors 530-1 to 530-3. In other words, the signal stream sorters 540-1 to 540-3 sort complex symbols extracted from each bundle in a format used before mapping and thus configure unmapped quasi-orthogonal signal streams. The quasi-orthogonal signal stream is decomposed in an orthogonal sub-signal stream unit by a transmitting end and is mapped to a predefined pattern that differs depending on a bundle. Therefore, each of the signal stream sorters 540-1 to 540-3 sorts complex symbols according to a mapping pattern of a bundle managed by each signal stream sorter. Further, each of the signal stream sorters 540-1 to 540-3 decomposes the quasi-orthogonal signal stream into orthogonal sub-signal streams and then provides the sub-signal stream correlation units 550-1-1 to 550-3-K with the orthogonal sub-signal streams in a divisive manner.

The sub-signal stream correlation units 550-1-1 to 550-3-K determine correlation values between candidate orthogonal sub-signal streams and the orthogonal sub-signal streams provided from the signal sorter 540-1 to 540-3. That is, the sub-signal stream correlation units 550-1-1 to 550-3-K store a list of the candidate orthogonal sub-signal streams. Upon receiving the orthogonal sub-signal stream, each of the sub-signal stream correlation units 550-1-1 to 550-3-K performs a correlation operation between each of the candidate orthogonal sub-signal streams and the received orthogonal sub-signal stream. For example, the correlation operation is performed as illustrated in Equation (2) above. Therefore, each of the signal stream correlation sub-signal stream correlation units 550-1-1 to 550-3-K outputs correlation values as many as the number of candidate orthogonal sub-signal streams. That is, the number of the determined correlation values is equal to the product between the number of candidate orthogonal sub-signal stream per bundle and the number of orthogonal sub-signal stream constituting one quasi-orthogonal signal streams.

The index detector 560 detects an orthogonal sub-signal stream index combination of the transmitted quasi-orthogonal signal stream by using correlation values provided from the sub-signal stream correlation units 550-1-1 to 550-3-K. A detailed structure and function of the index detector 560 will be described below with reference to FIG. 5B. The phase difference detector 570 detects a phase difference vector applied to the transmitted quasi-orthogonal signal stream by using correlation values provided from the sub-signal stream correlation units 550-1-1 to 550-3-K. A detailed structure and function of the phase difference detector 570 will be described below with reference to FIG. 5C.

The codeword determination unit 580 determines a quasi-orthogonal signal stream transmitted by the transmitting end by using the phase difference vector and the index combination detected by the index detector 560 and the phase difference detector 570. In other words, the codeword determination unit 580 determines that transmission is performed by applying the detected phase difference vector to a quasi-orthogonal signal stream consisting of orthogonal sub-signal streams corresponding to the detected index combination. The codeword determination unit 580 outputs a codeword corresponding to the quasi-orthogonal signal stream. The feedback decoder 590 analyzes the codeword to evaluate control information expressed by the codeword.

FIG. 5B is a block diagram illustrating a structure of an index detector in a broadband wireless communication system according to an exemplary embodiment of the present invention.

Referring to FIG. 5B, the index detector 560 includes a plurality of squarers 562-1-1 to 562-3-K, a plurality of adders 564-1 to 564-K and a maximum value search unit 566.

The squarers 562-1-1 to 562-3-K determine square values of the correlation values of orthogonal sub-signal streams provided from the sub-signal stream correlation units 550-1-1 to 550-3-K. In this case, each of the squarers 562-1-1 to 562-3-K receives correlation values as many as the number of candidate sub-signal streams and determines square correlation values as many as the number of candidate sub-signal streams. As a result, the number of the determined square correlation values per bundle is equal to the product between the number of candidate orthogonal sub-signal stream and the number of orthogonal sub-signal stream constituting one quasi-orthogonal signal stream.

For each orthogonal sub-signal stream, the adders 564-1 to 564-K sum the square correlation values provided from the squarers 562-1-1 to 562-3-K. In other words, the adders 564-1 to 564-K sum the determined square correlation values derived from the same candidate orthogonal sub-signal stream. In this case, each of the adders 564-1 to 564-K receives only square correlation values for an orthogonal sub-signal stream located in a position managed by each adder. That is, the addition operation is performed on the square correlation values derived from the same candidate orthogonal sub-signal stream among square correlation values of orthogonal sub-signal stream located in the same position. For example, the adder 564-1 manages a first position and receives square correlation values as many as the number of candidate orthogonal sub-signal streams respectively from the squarers 562-1-1, 562-2-1 and 562-3-1. Further, the adder 564-1 sums square correlation values derived from the same candidate orthogonal sub-signal stream among square correlation values as many as the number of candidate orthogonal sub-signal streams provided respectively from the squarers 562-1-1, 562-2-1 and 562-3-1, and outputs sums of the square correlation values as many as the number of orthogonal sub-signal streams. Accordingly, the number of the determined sums of the square correlation values is the same as the number of candidate orthogonal sub-signal streams for each position of the orthogonal sub-signal stream.

The maximum value search unit 566 searches for a maximum value for each position of an orthogonal sub-carrier among the sums of the square correlation values. In other words, the maximum value search unit 566 searches for a maximum value corresponding to each of the adders 564-1 to 564-K among the sums of the square correlation values provided respectively from the adders 564-1 to 564-K. That is, the maximum value search unit 566 searches for maximum values as many as the number of orthogonal sub-signal streams constituting one quasi-orthogonal signal stream. As a result, the maximum values corresponding to positions of the respective orthogonal sub-signal streams are searched for. Further, the maximum value search unit 566 evaluates indices of orthogonal sub-signal streams corresponding to the maximum values, and provides the codeword determination unit 580 with an index combination in which the evaluated indices are listed.

FIG. 5C is a block diagram illustrating a structure of a phase difference detector in a broadband wireless communication system according to an exemplary embodiment of the present invention.

Referring to FIG. 5C, the phase difference detector 570 includes a plurality of phase difference vector multipliers 572-1 to 572-3, a plurality of squarers 574-1 to 574-3, an adder 576 and a maximum value search unit 578.

The phase difference vector multipliers 572-1 to 572-3 multiply correlation values of orthogonal sub-signal streams provided from the sub-signal stream correlation units 550-1-1 to 550-3-K by a phase difference vector. In this case, the phase difference vector multipliers 572-1 to 572-3 sequentially use available phase difference vectors. Further, the phase difference vector multipliers 572-1 to 572-3 multiply correlation values by elements of a phase difference vector corresponding to a position of a specific orthogonal sub-signal stream.

For example, the phase difference vector multiplier 572-1 sequentially multiplies the correlation value provided from the sub-signal correlation unit 550-1-1 by each of first elements of the phase difference vectors. Further, the phase difference vector multipliers 572-1 to 572-3 sum the correlation values multiplied by each element of the phase difference vectors. In this case, a summation operation is performed on correlation values of an orthogonal sub-signal stream included in the same bundle. As a result, the number of the sums of the correlation values is equal to the number of phase difference vectors per bundle.

The squarers 574-1 to 574-3 determine square values of the sums of the correlation values multiplied by the phase difference vectors provided from the phase difference vector multipliers 572-1 to 572-3. In this case, the sums of the correlation values are sequentially provided as many as the number of available phase difference vectors respectively from the phase difference vector multipliers 572-1 to 572-3. Accordingly, each of the squarers 574-1 to 574-3 sequentially outputs square values of the sums of the correlation values as many as the number of available phase difference vectors.

The adder 576 receives the square values of the sums of the correlation values from the squarers 574-1 to 574-3 and then sums the received square values. In this case, the square values of the sums of the correlation values are sequentially provided as many as the number of available phase difference vectors and the adder 576 outputs the sums of the square values as many as the number of available phase difference vectors. Accordingly, the number of the determined sums of the square values is equal to the number of available phase difference vectors. In this case, the sums of the square values respectively correspond to the phase difference vectors.

The maximum value search unit 578 searches for a maximum value among the sums of the square values sequentially provided. Further, the maximum value search unit 578 evaluates a phase difference vector corresponding to the maximum value and reports the evaluated phase difference vector to the codeword determination unit 580.

Hereinafter, operations of a transmitting end and a receiving end which use a quasi-orthogonal signal stream group generated as described above will be described with reference to the accompanying drawings.

Figure 6:
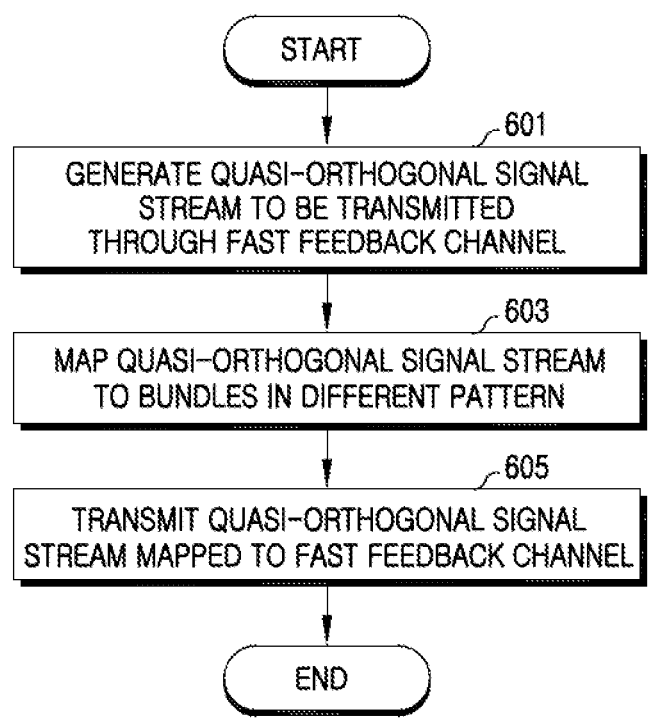
FIG. 6 is a flowchart illustrating a process of transmitting a quasi-orthogonal signal stream of a transmitting end in a broadband wireless communication system according to an exemplary embodiment of the present invention.

FIG. 6 is a flowchart illustrating a process of transmitting a quasi-orthogonal signal stream of a transmitting end in a broadband wireless communication system according to an exemplary embodiment of the present invention.

Referring to FIG. 6, the transmitting end generates a quasi-orthogonal signal stream to be transmitted through a fast feedback channel in step 601. In this case, the quasi-orthogonal signal stream is determined by a mapping relation between a predefined codeword and the quasi-orthogonal signal stream. In addition, the quasi-orthogonal signal has a format that differs depending on a design rule of the quasi-orthogonal signal stream. Herein, the design rule includes a threshold of a correlation value between different quasi-orthogonal signal streams, the number of codewords to be used, and the like. For example, the format of the quasi-orthogonal signal stream and the mapping relation between the codeword and the quasi-orthogonal signal stream are shown in Table 2 and Table 3 above.

After the quasi-orthogonal signal stream is generated, the transmitting end maps the quasi-orthogonal signal stream to three bundles in different patterns in step 603. That is, the transmitting end maps the quasi-orthogonal signal stream so that one orthogonal sub-signal stream is located in physically contiguous tones. Further, the transmitting end maps the quasi-orthogonal signal stream so that orthogonal sub-signal streams are arranged in different orders in each bundle. In other words, the transmitting end arranges orthogonal sub-signal streams constituting the quasi-orthogonal signal stream in different orders while mapping the same quasi-orthogonal signal stream to bundles. For example, the transmitting end maps the quasi-orthogonal signal stream as illustrated in FIG. 2A or FIG. 2B above.

After mapping the quasi-orthogonal signal stream, the transmitting end transmits the quasi-orthogonal signal stream mapped to the fast feedback channel in step 605. That is, the transmitting end configures OFDM symbols by performing an IFFT operation and CP insertion, up-converts the OFDM symbols into an RF signal and then transmits the RF signal through an antenna.

Figure 7:
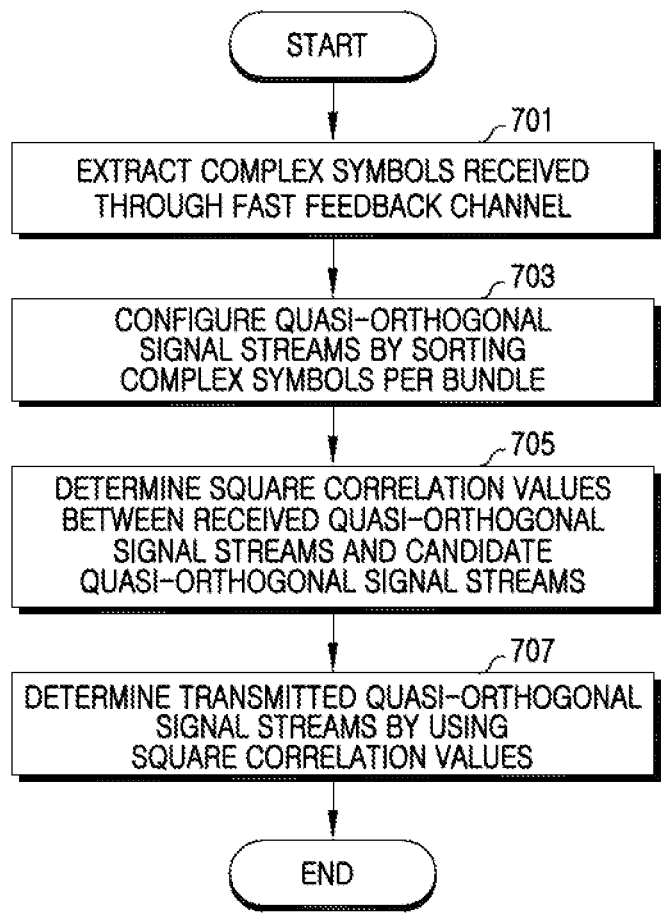
FIG. 7 is a flowchart illustrating a process of detecting a quasi-orthogonal signal stream of a receiving end in a broadband wireless communication system according to an exemplary embodiment of the present invention.

FIG. 7 is a flowchart illustrating a process of detecting a quasi-orthogonal signal stream of a receiving end in a broadband wireless communication system according to an exemplary embodiment of the present invention.

Referring to FIG. 7, the receiving end extracts complex symbols received through a fast feedback channel in step 701. That is, the receiving end down-converts an RF signal received through an antenna into a baseband signal, restores complex symbols mapped to a frequency domain by performing CP removal and an FFT operation, and then extracts complex symbols mapped to the fast feedback channel. In this case, the receiving end divides the complex symbols according to a bundle. Although complex symbols mapped to each bundle are elements of the same quasi-orthogonal signal stream, the elements of the quasi-orthogonal signal stream may be arranged differently depending on a bundle.

After extracting the complex symbols, the receiving end configures quasi-orthogonal signal streams per bundle by sorting complex symbols per bundle in step 703. The quasi-orthogonal signal stream is decomposed in an orthogonal sub-signal stream unit by a transmitting end and is mapped to a predefined pattern that differs depending on a bundle. Therefore, the receiving end sorts complex symbols according to a mapping pattern of each bundle. For example, the mapping pattern of each bundle is illustrated in FIG. 2A or FIG. 2B.

After configuring the quasi-orthogonal signal streams per bundle, the receiving end determines correlation values between received quasi-orthogonal signal streams and candidate quasi-orthogonal signal streams in step 705. In other words, the receiving end performs a correlation operation between each of the candidate quasi-orthogonal signal streams and the quasi-orthogonal signal stream received according to each bundle. For example, the correlation operation is performed as illustrated in Equation (2) above. Therefore, the number of determined correlation values is equal to the number of candidate quasi-orthogonal signal streams. The receiving end determines square values of the correlation values.

After determining the square values of the correlation values, the receiving end determines a transmitted quasi-orthogonal signal stream by using the square values of the correlation values in step 707. That is, the receiving end adds the square correlation values for each quasi-orthogonal signal stream used to determine correlation values. Accordingly, the number of the determined square correlation values is equal to the number of candidate quasi-orthogonal signal streams. Thereafter, the receiving end searches for a maximum value among the sums of the square correlation values and determines that a quasi-orthogonal signal stream corresponding to the maximum value is transmitted.

Figure 8A:
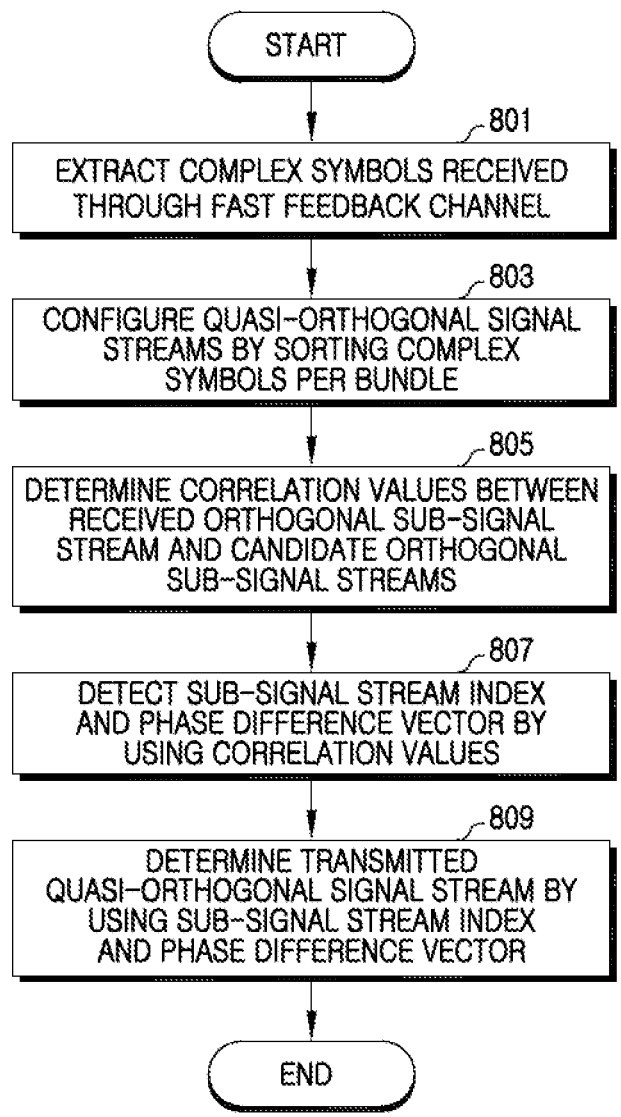
FIGS. 8A to 8C are flowcharts illustrating a process of detecting a quasi-orthogonal signal stream of a receiving end in a broadband wireless communication system according to an exemplary embodiment of the present invention.

FIG. 8A is a flowchart illustrating a process of detecting a quasi-orthogonal signal stream of a receiving end in a broadband wireless communication system according to an exemplary embodiment of the present invention.

Figure 8B:
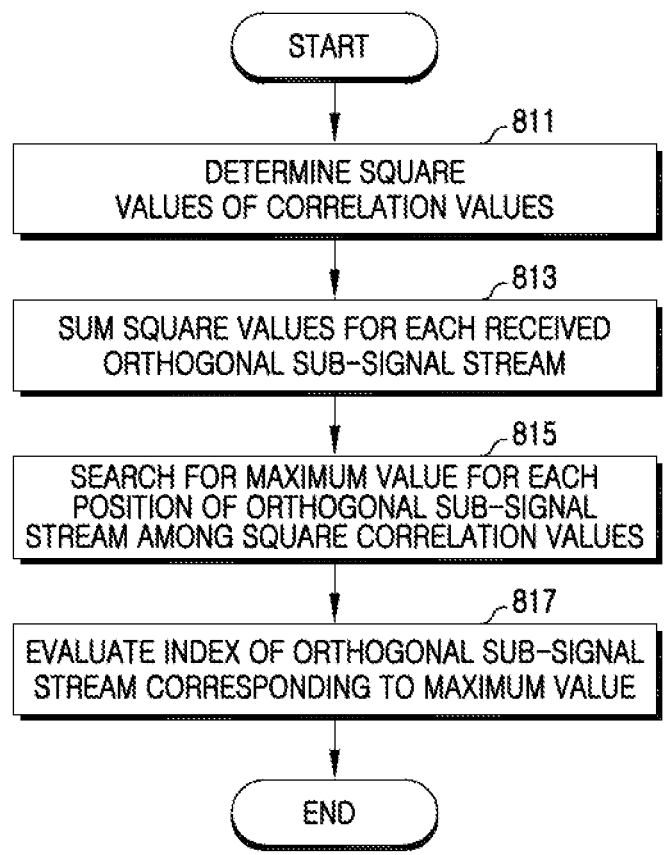

Referring to FIG. 8B, the receiving end extracts complex symbols received through a fast feedback channel in step 801. That is, the receiving end down-converts an RF signal received through an antenna into a baseband signal, restores complex symbols mapped to a frequency domain by performing CP removal and an FFT operation and then extracts complex symbols mapped to the fast feedback channel. In this case, the receiving end divides the complex symbols according to a bundle. Although complex symbols mapped to each bundle are elements of the same quasi-orthogonal signal stream, the elements of the quasi-orthogonal signal stream may be arranged differently depending on a bundle.

After extracting the complex symbols, the receiving end configures quasi-orthogonal signal streams per bundle by sorting complex symbols per bundle in step 803. The quasi-orthogonal signal stream is decomposed in an orthogonal sub-signal stream unit by a transmitting end and is mapped to a predefined pattern that differs depending on a bundle. Therefore, the receiving end sorts complex symbols according to a mapping pattern of each bundle. For example, the mapping pattern of each bundle is illustrated in FIG. 2A or FIG. 2B.

After configuring the quasi-orthogonal signal streams per bundle, the receiving end determines correlation values between received orthogonal sub-signal stream and candidate orthogonal sub-signal streams in step 805. In other words, the receiving end performs a correlation operation between each of the candidate orthogonal sub-signal streams and the orthogonal sub-signal stream received according to each bundle. For example, the correlation operation is performed as illustrated in Equation (2) above. Therefore, the number of determined correlation values is equal to the product between the number of candidate orthogonal sub-signal streams per bundle and the number of orthogonal sub-signal streams constituting one quasi-orthogonal signal stream.

After determining the correlation values, the receiving end detects a sub-signal stream index and a phase difference vector by using the correlation values in step 807. In other words, the receiving end evaluates an index of orthogonal sub-signal streams constituting a transmitted quasi-orthogonal sub-signal streams and also evaluates an applied phase difference vector. A detailed process for detecting the sub-signal stream index and a detailed process for detecting the phase difference vector will be described with reference to FIG. 8B and FIG. 8C.

After detecting the sub-signal stream index and the phase difference vector, the receiving end determines a transmitted quasi-orthogonal signal stream by using the sub-signal stream index and the phase difference vector in step 809. In other words, the receiving end determines that transmission is performed by applying the detected phase difference vector to a quasi-orthogonal signal stream consisting of orthogonal sub-signal streams corresponding to a combination of the detected index combination.

FIG. 8B is a flowchart illustrating a process of detecting a sub-signal stream index of a receiving end in a broadband wireless communication system according to an exemplary embodiment of the present invention.

Referring to FIG. 8B, the receiving end determines square values of correlation values between received orthogonal sub-signal streams and candidate orthogonal sub-signal streams in step 811. Therefore, the number of determined correlation values is equal to the product between the number of candidate orthogonal sub-signal stream per bundle and the number of orthogonal sub-signal stream constituting one quasi-orthogonal signal stream.

After determining the square correlation values, the receiving end sums the square correlation values for each received orthogonal sub-signal stream in step 813. In other words, the receiving end adds square correlation values of the same orthogonal sub-signal stream. In this case, the addition operation is performed on the square correlation values derived from the same candidate orthogonal sub-signal stream among square correlation values of orthogonal sub-signal stream located in the same position, and the added square correlation values are present as many as the number of bundles. Accordingly, the number of the determined sums of the square correlation values is equal to the number of candidate orthogonal sub-signal streams for each position of an orthogonal sub-signal stream.

After adding the square correlation values for each orthogonal sub-signal stream, the receiving end searches for a maximum value for each position of an orthogonal sub-signal stream among the square correlation values in step 815. That is, the receiving end searches for maximum values as many as the number of orthogonal sub-signal streams constituting one quasi-orthogonal signal stream. As a result, the maximum values corresponding to positions of the respective orthogonal sub-signal streams are searched for.

After searching for the maximum value for each position of the orthogonal sub-signal stream, the receiving end evaluates an index of an orthogonal sub-signal stream corresponding to each of the maximum value in step 817. In other words, the receiving end evaluates an orthogonal sub-signal stream index corresponding to a position of each orthogonal sub-signal stream. As a result, indices of orthogonal sub-signal streams constituting the quasi-orthogonal signal stream are evaluated.

Figure 8C:
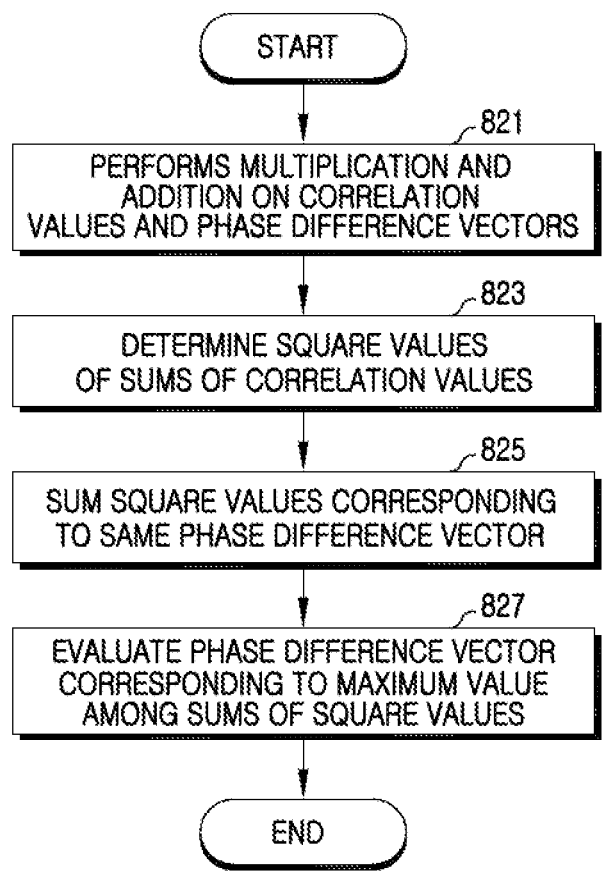

FIG. 8C is a flowchart illustrating a process of detecting a phase difference vector of a receiving end in a broadband wireless communication system according to an exemplary embodiment of the present invention.

Referring to FIG. 8C, the receiving end performs multiplication and addition on correlation values and phase difference vectors in step 821. In this case, the receiving end sequentially uses available phase difference vectors. In addition, the receiving end multiplies a correlation value by an element of a phase difference vector corresponding to a position of a specific orthogonal sub-signal stream. That is, correlation values of an orthogonal sub-signal stream in a first position are multiplied by a first element of the phase difference vector. In this case, the addition operation is performed on correlation values of an orthogonal sub-signal stream included in the same bundle. As a result, the number of the determined sums of the correlation values is equal to the number of phase difference vectors per bundle.

After performing multiplication and addition on the phase difference vectors, the receiving end determines square values of sums of correlation values in step 823. In this case, sums of correlation values are present as many as the number of available phase difference vectors per bundle. Accordingly, the number of the determined square values of sums of correlation values is equal to the number of available phase difference vectors.

After determining the square values of the sums of the correlation values, the receiving end sums square values corresponding to the same phase difference vector in step 825. In this case, square values of sums of correlation values are present as many as the number of available phase difference vectors per bundle. Therefore, the number of the determined sums of the square values is equal to the number of available phase difference vectors. The sums of the square values respectively correspond to phase difference vectors.

After summing the square values, the receiving end evaluates a phase difference vector corresponding to a maximum value among the sums of the square values in step 827. That is, the receiving end searches for maximum values among the sums of the square values and evaluates a phase difference vector corresponding to the maximum value.

According to exemplary embodiments of the present invention, a broadband wireless communication system uses a quasi-orthogonal signal stream to increase an amount of information transmitted and received through a fast feedback channel. In addition, despite the increased information amount, accurate information delivery and reliable system operation are possible without being affected by a channel estimation error or the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmitting-end apparatus in a wireless communication system, the apparatus comprising:
   a plurality of mappers for mapping a sequence, corresponding to an index to be fed back, to a first set of resource blocks in a fast feedback channel by using a first mapping pattern and to a second set of resource blocks in the fast feedback channel by using a second mapping pattern; and
   a transmitter for transmitting the sequence mapped to a plurality of sets of resource blocks,
   wherein the sequence is mapped to each of the plurality of sets of resource blocks, and
   wherein each element of the sequence is mapped to each resource block,
   wherein a mapping order of elements of the sequence in the first mapping pattern is different from a mapping order of elements of the sequence in the second mapping pattern,
   wherein the first set of resource blocks and second set of resource blocks have a predetermined same number of resource blocks each other, and
   wherein the first set of resource blocks is differently located from the second set of resource block in the fast feedback channel.

2. The apparatus of claim 1, wherein the sequence comprises one of sequences included in a sequence group designed such that a correlation value between all possible signal pairs is one of less than and equal to a threshold.

3. The apparatus of claim 1, wherein the sequence is determined as one of predefined candidates, the predefined candidates comprising '1111111111111', '101111010110', '011010111101', '001010010100', '101010101010', '111010000011', '001111101000', '011111000001', '110011001100', '100011100101', '010110001110', '000110100111', '100110011001', '110110110000', '000011011011', '010011110010', 101011111100', '111011010101', '001110111110', '011110010111', '111110101001', '101110000000', '011011101011', '001011000010', '100111001111', '110111100110', '000010001101', '010010100100', '110010011010', '100010110011', '010111011000', '000111110001', 101011001001', '111011100000', '001110001011', '011110100010', '100111111010', '110111010011', '000010111000', '010010010001', '111110011100', '101110110101', '011011011110', '001011110111', '101010011111', '111010110110', '001111011101', '011111110100', 111111001010', '101111100011', '011010001000', '001010100001', '110010101111', '100010000110', '010111101101', '000111000100', '100110101100', '110110000101', '000011101110', '010011000111', '110011111001', '100011010000', '010110111011' and '000110010010'.

4. The apparatus of claim 3,
   wherein the mappers map the sequence to three sets of resource blocks comprising a size of 6×2 in a time axis and a symbol axis,
   wherein, for the first set of resource blocks, the mappers map a 0th element, a 2nd element, a 4th element, a 6th element, a 8th element and a 10th element, in that order, in first row of a frequency axis, and maps the 1st element, the 3rd element, the 5th element, the 7th element, the 9th element, and the 11th element, in that order, in second row of the frequency axis,
   wherein, for the second set of resource blocks, the mappers map the 9th element, the 11th element, the 4th element, the 0th element, the 2nd element and the 7th element, in that order, in first row of the frequency axis, and maps the 10th element, the 3rd element, the 5th element, the 1st element, the 6th element and the 8th element, in that order, in second row of the frequency axis, and
   wherein, for a third set of resource blocks, the mappers map the 3rd element, the 5th element, the 7th element, the 9th element, the 11th element and the 1st element, in that order, in first row of the frequency axis, and maps the 4th element, the 6th element, the 8th element, the 10th element, the 0th element and the 2nd element, in that order, in second row of the frequency axis.

5. A method for transmitting feedback information through a fast feedback channel in a wireless communication system, the method comprising:
   mapping a sequence, corresponding to an index to be fed back, to a first set of resource blocks in a fast feedback channel by using a first mapping pattern and to a second set of resource blocks in the fast feedback channel by using a second mapping pattern; and
   transmitting the sequence mapped to a plurality of sets of resource blocks,
   wherein the sequence is mapped to each of the plurality of sets of resource blocks, and
   wherein each element of the sequence is mapped to each resource block,
   wherein a mapping order of elements of the sequence in the first mapping pattern is different from a mapping order of elements of the sequence in the second mapping pattern,
   wherein the first set of resource blocks and second set of resource blocks have a predetermined same number of resource blocks each other, and
   wherein the first set of resource blocks is differently located from the second set of resource block in the fast feedback channel.

6. The method of claim 5, wherein the sequence comprises one of sequences included in a sequence group designed such that a correlation value between all possible signal pairs is one of less than and equal to a threshold.

7. The method of claim 5, wherein the sequence is determined as one of predefined candidates, the predefined candidates comprising '1111111111111', '101111010110', '011010111101', '001010010100', '101010101010', '111010000011', '001111101000', '011111000001', '110011001100', '100011100101', '010110001110', '000110100111', '100110011001', '110110110000',
'000011011011', '010011110010', 101011111100',
'111011010101', '001110111110', '011110010111',
'111110101001', '101110000000', '011011101011',
'001011000010', '100111001111', '110111100110',
'000010001101', '010010100100', '110010011010',
'100010110011', '010111011000', '000111110001',
101011001001', '111011100000', '001110001011',
'011110100010', '100111111010', '110111010011',
'000010111000', '010010010001', '111110011100',
'101110110101', '011011011110', '001011110111',
'101010011111', '111010110110', '001111011101',
'011111110100', 111111001010', '101111100011',
'011010001000', '001010100001', '110010101111',
'100010000110', '010111101101', '000111000100',
'100110101100', '110110000101', '000011101110',
'010011000111', '110011111001', '100011010000',
'010110111011' and '000110010010'.

8. The method of claim 7,
wherein the sequence is mapped to three sets of resource blocks comprising a size of 6×2 in a time axis and a symbol axis,
wherein, for the first set of resource blocks, a 0th element, a 2nd element, a 4th element, a 6th element, a 8th element and a 10th element are mapped, in that order, in first row of a frequency axis, and symbols 1, 3, 5, 7, 9 and 11 are mapped, in that order, in second row of the frequency axis,
wherein, for the second set of resource blocks, the 9th element, the 11th element, the 4th element, the 0th element, the 2nd element and the 7th element are mapped, in that order, in first row of the frequency axis, and the 10th element, the 3rd element, the 5th element, the 1st element, the 6th element and the 8th element are mapped, in that order, in second row of the frequency axis, and
wherein, for a third set of resource blocks, the 3rd element, the 5th element, the 7th element, the 9th element, the 11th element and the 1st element are mapped, in that order, in first row of the frequency axis, and the 4th element, the 6th element, the 8th element, the 10th element, the 0th element and the 2nd element are mapped, in that order, in second row of the frequency axis.

* * * * *